United States Patent
Neace

(10) Patent No.: US 9,447,914 B2
(45) Date of Patent: Sep. 20, 2016

(54) HANGER FOR HANGING OBJECT FROM SUPPORT ROD INCLUDING HOOKS

(71) Applicant: Cooper Technologies Company, Houston, TX (US)

(72) Inventor: Bruce Alan Neace, Mascoutah, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/100,715

(22) Filed: Dec. 9, 2013

(65) Prior Publication Data

US 2014/0103175 A1 Apr. 17, 2014

Related U.S. Application Data

(62) Division of application No. 11/404,668, filed on Apr. 14, 2006, now Pat. No. 8,602,365.

(51) Int. Cl.
*F16M 13/02* (2006.01)
*F16B 45/00* (2006.01)
*H02G 3/32* (2006.01)

(52) U.S. Cl.
CPC .............. *F16M 13/02* (2013.01); *F16B 45/00* (2013.01); *H02G 3/32* (2013.01)

(58) Field of Classification Search
CPC .... H02G 3/0443; H02G 3/32; B60N 2/5664; F16B 45/00
USPC ............ 248/316.7, 301, 303, 304, 305, 306, 248/302, 249; 211/106, 106.01, 126.1, 211/133.5; 403/346; 174/19, 480, 481, 35
See application file for complete search history.

(56) References Cited

U.S. PATENT DOCUMENTS

| | | | | |
|---|---|---|---|---|
| 394,792 A * | 12/1888 | Shoe | .............................. | 248/304 |
| 810,004 A * | 1/1906 | Tabler | ............................. | 248/61 |
| 877,453 A * | 1/1908 | Quinn | ........................... | 248/301 |
| 879,148 A | 2/1908 | Cummings | | |
| 1,447,636 A | 3/1923 | White | | |
| 2,659,561 A | 11/1953 | Kindorf | | |
| 3,017,205 A * | 1/1962 | Williams | ....................... | 403/397 |
| 3,023,470 A | 3/1962 | Patten | | |
| 3,160,378 A | 12/1964 | Goewey | | |
| 3,278,148 A | 10/1966 | Denaro | | |
| 3,341,909 A | 9/1967 | Havener | | |
| 3,589,660 A * | 6/1971 | Dunckel | ................. | F21V 21/02 248/343 |
| 3,780,973 A * | 12/1973 | Dalton, Jr. | .............. | E04B 9/006 248/228.8 |
| 3,806,994 A * | 4/1974 | Lankford | ...................... | 403/397 |
| 3,982,719 A | 9/1976 | Kilborne | | |
| 4,014,504 A | 3/1977 | Sachs | | |
| 4,300,745 A * | 11/1981 | Peterson | ....................... | 248/546 |

(Continued)

OTHER PUBLICATIONS

Cablofil, "AS Trapeze Hanging Clip," undated, online catalog at www.cablofil.com, 2 pages.

(Continued)

*Primary Examiner* — Nkeisha Smith
(74) *Attorney, Agent, or Firm* — Senniger Powers LLP

(57) ABSTRACT

A hanger for hanging an object from a generally vertical support rod includes a hanger body, a first set of one or more hooks on the hanger body defining a first hook-defined recess, and a second set of one or more hooks on the hanger body defining a second hook-defined recess. The first and second hook-defined recesses have different transverse dimensions for receiving support rods having respective first and second different diameters.

6 Claims, 18 Drawing Sheets

(56) References Cited

U.S. PATENT DOCUMENTS

| | | | |
|---|---|---|---|
| 4,526,428 | A | 7/1985 | Sachs |
| 4,941,633 | A | 7/1990 | Walker et al. |
| 5,021,612 | A | 6/1991 | Joffe |
| 5,351,920 | A * | 10/1994 | Decky et al. .................. 248/73 |
| 5,384,937 | A * | 1/1995 | Simon ............................ 24/295 |
| 5,509,632 | A * | 4/1996 | Mesna et al. ................. 248/301 |
| 5,573,217 | A * | 11/1996 | Garvey et al. ............. 248/316.7 |
| 6,050,766 | A | 4/2000 | Kies et al. |
| 6,189,248 | B1 | 2/2001 | Nagel et al. |
| 6,302,365 | B1 | 10/2001 | Catanzarite et al. |
| 6,322,029 | B1 | 11/2001 | Sonnenberg et al. |
| 6,530,545 | B2 | 3/2003 | Deciry et al. |
| 6,631,876 | B1 * | 10/2003 | Phillips ......................... 248/74.2 |
| 6,643,900 | B2 * | 11/2003 | Jahrling .......................... 24/563 |
| 6,766,992 | B1 | 7/2004 | Parker |
| 6,807,791 | B2 | 10/2004 | Herb |
| 7,073,761 | B2 | 7/2006 | Diggle et al. |
| 7,431,252 | B2 * | 10/2008 | Birli et al. ............... 248/221.11 |
| 7,468,491 | B2 * | 12/2008 | Deciry et al. ................. 174/480 |
| 7,544,895 | B2 * | 6/2009 | Penichon ...................... 174/135 |
| 7,708,491 | B2 * | 5/2010 | Quertelet et al. ............. 403/346 |
| 7,903,924 | B2 * | 3/2011 | Pollard et al. ................ 385/135 |
| 7,954,776 | B2 * | 6/2011 | Davis et al. ................ 248/231.81 |
| 8,157,235 | B2 * | 4/2012 | Quertelet et al. ............. 248/339 |
| 8,173,903 | B2 * | 5/2012 | Letourneur et al. .......... 174/135 |
| 8,757,559 | B2 * | 6/2014 | Davis et al. .................... 248/49 |
| 2003/0230685 | A1 | 12/2003 | Valiulis et al. |
| 2006/0102820 | A1 | 5/2006 | Boville |
| 2008/0179089 | A1 * | 7/2008 | Deciry et al. ................. 174/84 R |
| 2009/0308654 | A1 * | 12/2009 | Hill et al. ..................... 174/481 |
| 2010/0260463 | A1 * | 10/2010 | Pollard et al. ................ 385/135 |

OTHER PUBLICATIONS

Flextray, "Trapeze Support," Jan. 1997, online catalog at www.flextray.com, 3 pages.

Cooper B-Line, "Attachments—Supports," 2004, front cover and back page, Cooper B-Line Catalog, pp. 16-18.

* cited by examiner

HANGER FOR HANGING OBJECT FROM SUPPORT ROD INCLUDING HOOKS

CROSS-REFERENCE TO RELATED APPLICATION

This application is a divisional of U.S. patent application Ser. No. 11/404,668, filed Apr. 14, 2006, the entire contents of which is incorporated herein by reference.

BACKGROUND OF THE INVENTION

This invention relates generally to hangers, and more particularly to hangers for supporting objects on one or more support rods attached to framing in a building.

Vertical support rods are often used to support objects in buildings, such as cable tray used for routing electrical "cable" (i.e., conductors for transmitting electrical or optical signals or electrical power). One such type of tray is "wire basket" cable tray formed from wire members extending longitudinally and transversely of the tray. The threaded support rods used to support such cable tray, sometimes referred to as all-thread rods, generally come in standard sizes, such as a 0.25 in. and 0.375 in diameter rod for lighter duty applications and a 0.500 in. and 0.625 in. diameter rod for heavier duty applications. The hangers used to support cable tray on these vertical rods come in a wide variety of sizes and shapes. In conventional designs, the hanger is usually attached to a support rod by two nuts threaded on the rod above and below the hanger. To accommodate different rod sizes, the hanger has a large opening to receive the largest rod size. The wide opening often requires installing flat washers on both sides of the hanger. The process of properly positioning both nuts (and the washers, if used) on the support rod to secure the hanger in place is time-consuming and cumbersome. Reference may be made to U.S. Pat. No. 6,530,545 for one example of a prior hanger.

There is a need, therefore, for an improved hanger which facilitates attachment of objects to a support rod, including objects such as cable tray, and more particularly "wire basket" cable tray.

SUMMARY OF THE INVENTION

One aspect of this invention is directed to a hanger adapted for hanging an object from a generally vertical support rod. The hanger comprises a hanger body having first and second sides, a first set of one or more hooks on the hanger body for receiving the support rod, and a second set of one or more hooks on the hanger body for receiving a portion of the object supported by the hanger.

In another aspect, a hanger of this invention is adapted for hanging an object from a generally vertical support rod. The hanger comprises a hanger body, at least two hooks extending from a first side of the hanger body for receiving the support rod, and a gap between the at least two hooks for receiving a nut threaded on the support rod when the support rod is received in the at least two hooks.

In another aspect, the hanger comprises a hanger body, a first set of one or more hooks on the hanger body defining a first hook-defined recess, and a second set of one or more hooks on the hanger body defining a second hook-defined recess. The first and second hook-defined recesses have different transverse dimensions for receiving support rods having respective first and second different diameters.

Other features will be in part apparent and in part pointed out hereinafter.

BRIEF DESCRIPTION OF THE DRAWINGS

Corresponding parts are designated by corresponding reference characters throughout the drawings.

DETAILED DESCRIPTION

Figure 1:
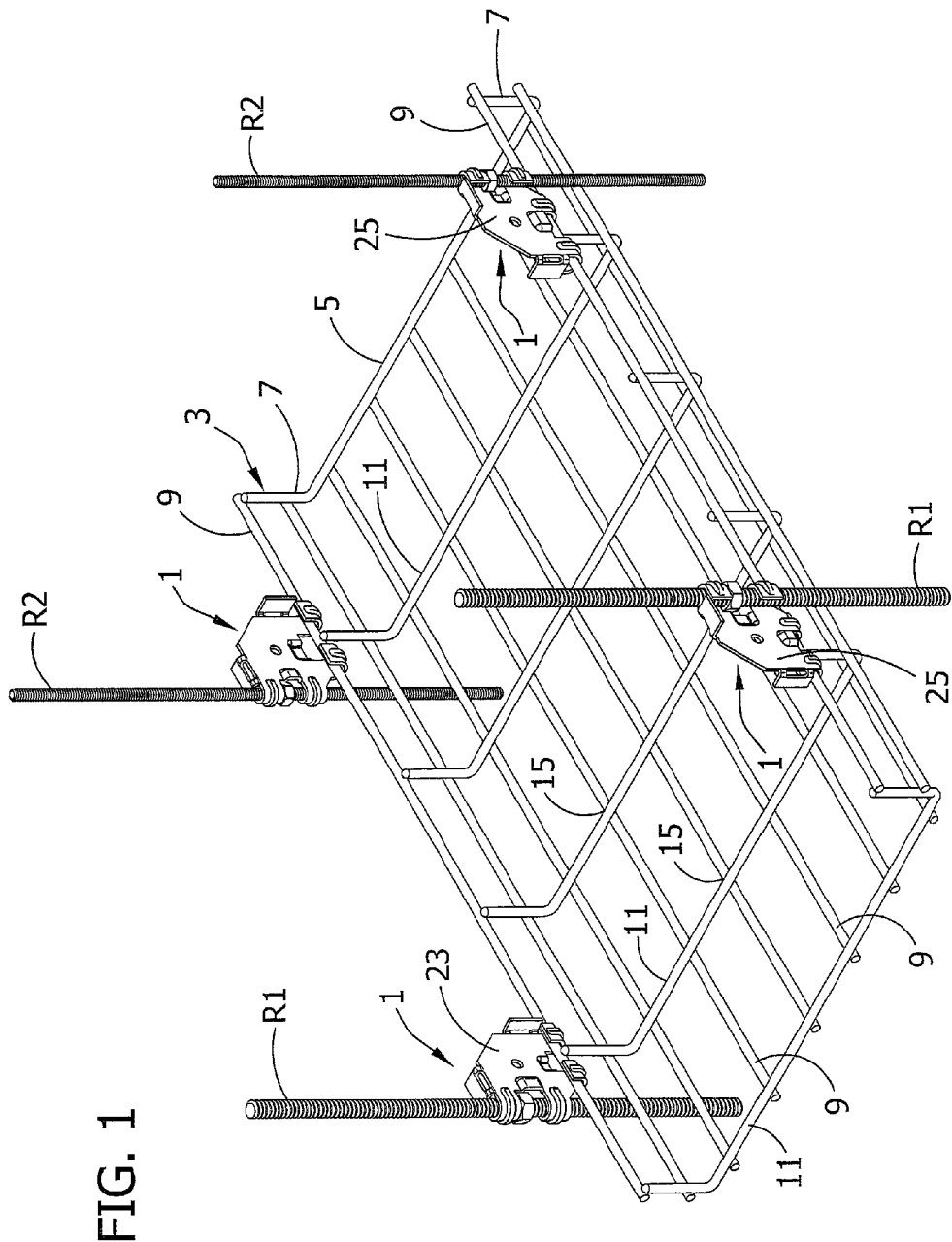
FIG. 1 is a perspective view of several hangers of this invention supporting a wire basket cable tray on a number of threaded support rods.

FIG. 1 shows several hangers of this invention, each generally designated 1, mounted on all-thread support rods R1, R2. The hangers are used to hang various objects, including "wire basket" cable tray of the type indicated at 3 in FIG. 1. As shown, the cable tray 3 has a bottom 5 and two upstanding side walls 7 for holding and routing electrical cable. The tray 3 is formed by a first plurality of generally parallel wire members 9 extending generally longitudinally of the tray, and a second plurality of wire members 11 extending generally transversely of the tray. The longitudinal and transverse wire members are joined at cross-over locations or intersections 15.

Figure 2:
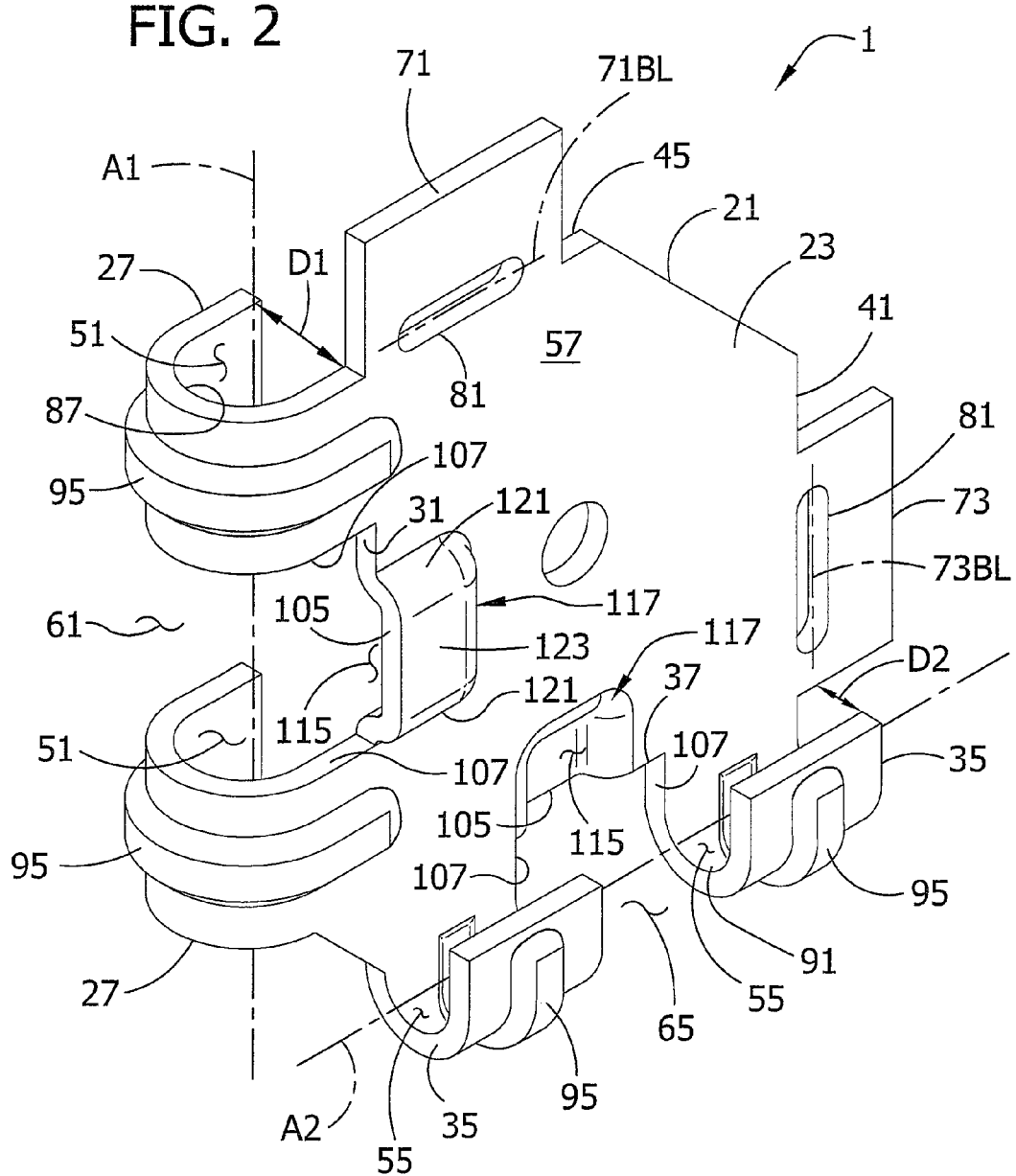
FIG. 2 is a view of one embodiment of a hanger of this invention prior to use.

Referring to FIG. 2, the hanger 1 comprises a hanger body 21 having a first (front) face 23 and an opposite second (back) face 25 (FIG. 1). A first set of one or more hooks 27 extends from a first side 31 of the body 21, and a second set of one or more hooks 35 extends from a second side 37 of the body adjacent the first side 31. In the illustrated embodiment, the hanger body 21 is relatively thin, generally planar, and polygonal in shape with a third side 41 generally opposite the first side 31 and a fourth side 45 generally opposite the second side 37. However, it will be understood that the hanger body 21 could have other shapes without departing from the scope of this invention. The first set of one or more hooks 27 is shown as comprising two hooks (each designated 27) which define a first elongate recess 51, and the second set of one or more hooks 35 is shown as comprising two hooks (each designated 35) which define a second elongate recess 55. The hook-defined recesses 51, 55 are on opposite sides of a plane 57 defined by the hanger body 21 and have respective axes A1, A2 generally at an angle relative to one another. (By way of example, this angle may be approximately 90 degrees, plus or minus 5 degrees to offset any asymmetry or other features of the hanger to that it hangs at the desired orientation.) The two hooks 27 of the first set have a first gap 61 between them, and the two hooks 35 of the second set have a second gap 65 between them. It will be understood that the number of hooks in each set can vary.

The hanger 1 also includes first and second field-bendable tabs 71, 73 projecting from the hanger body 21. In its factory (un-deformed) state or condition, the first tab 71 projects from the fourth side 45 of the hanger body generally in the plane 57 of the body. Similarly, in its factory (un-deformed) state or condition, the second tab 73 projects from the third side 41 of the hanger body, also generally in the plane of the body. These tabs are bendable along bend lines 71BL and 73BL, respectively, preferably generally adjacent and parallel to respective side edges of the hanger body. To facilitate bending, one or more openings (e.g., slots 81) may be provided along these bend lines.

In accordance with one aspect of this invention, the hanger 1 can be used with support rods having different diameters. In this regard, the first hook-defined recess 51 (see FIG. 2) preferably has a transverse dimension D1 suitable for receiving a support rod R1 of a first diameter, and the second hook-defined recess 55 has a smaller transverse dimension D2 suitable for receiving a smaller-diameter support rod R2. By way of example, each hook 27 defining the first recess 51 is generally J-shaped and has an arcuate support surface 87 with a diameter of about 0.390 in. for snugly receiving and cradling a 0.375 in. diameter rod R1. Similarly, each hook 35 defining the recess 55 is generally J-shaped and has an arcuate support surface 91 with a diameter of about 0.265 in. for snugly receiving and cradling a 0.250 in. diameter rod. Other dimensions are possible. A reinforcing rib 95 extends along the length of each hook 27, 35 for added strength. Also, while the hooks are shown as generally J-shaped, they can have other shapes (e.g., channel-shaped).

FIG. 1 illustrates the use of the hanger 1 on two support rods R1, R2 having different diameters. As will be observed, the orientation of the hanger 1 varies from one rod to the other so that the rod R1, R2 is received in the appropriate set of one more hooks 27, 35 sized for that rod. The other set of hooks receives a longitudinally-extending wire member 9 of the tray 3. The diameter of this wire member is typically substantially less than the diameter of a support rod (R1 or R2). For example, the wire member 9 may have a diameter of about 0.20 in.

To use the hanger on the larger diameter rod in FIG. 1, the hanger is oriented so that the first set of one or more hooks 27 defining the larger recess 51 receives the rod R1 and the second set of one or more hooks 35 defining the smaller size recess 55 receives a longitudinally extending wire member 9 of the wire basket. The gap 61 between the hooks 27 of the first set receives a single nut 99 threaded on the rod, and the gap 65 between the two hooks 35 of the second set receives a transverse wire member 11 of the tray, if a transverse wire happens to be positioned to be received in the gap. With the hanger 1 thus positioned, the first tab 71 is bent down in a generally rearward direction, as shown, to prevent substantial lateral movement of the rod R1 relative to the hanger 1, thereby retaining the support rod in the first hook-defined recess 51. The second tab 73 is also bent in a forward direction to prevent substantial vertical movement of the tray 3 relative to the hanger 1, thereby retaining the longitudinal wire member 9 in the second hook-defined recess 55. The tabs 71, 73 can be bent manually by hand or by using a suitable tool (e.g., screw driver or pliers). As used in this orientation, the smaller diameter rod R2 is snugly received in the first hook-defined recess 51, and the hanger 1 is secured in substantially fixed position on the rod R1 by the one nut 99 and the bent first tab 71. The vertical position of the hanger 1 (and thus the elevation of the tray 3) can be readily adjusted by threading the nut 99 up or down on the rod R1.

To use the hanger 1 on the smaller-diameter support rod R2 in FIG. 1, the hanger is positioned such that the second set of one or more hooks 35 defining the smaller recess 55 receives the support rod R2 and the first set of one or more hooks 27 defining the larger size recess 51 receives a longitudinal wire member 9 of the tray 3. The gaps 61, 65 between the respective hooks 27, 35 receive the nut 99 and any transverse wire member 11, as described above. (For convenience, the gaps 61, 65 may have approximately the same width, e.g., 0.625 in.) With the hanger 1 in this position, the tabs 71, 73 are bent to retain the support rod R2 and longitudinal wire member 9 in respective hook-defined recesses 51, 55.

Figure 3:
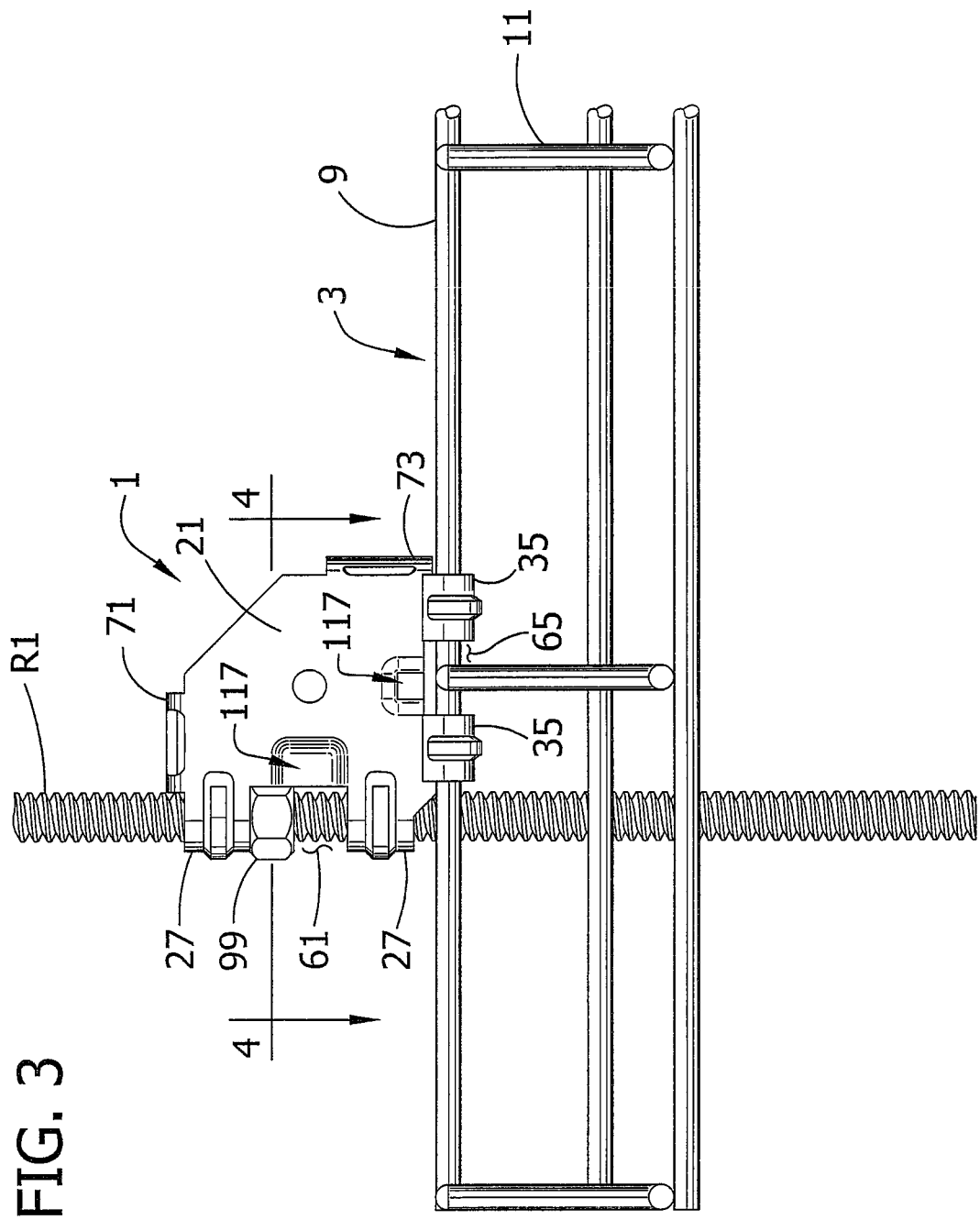
FIG. 3 is a front elevation of one of the hangers in FIG. 1 and a nut supporting the hanger on a respective support rod, the nut being shown in a locked position in which it is prevented from rotation on the rod.
Figure 4:
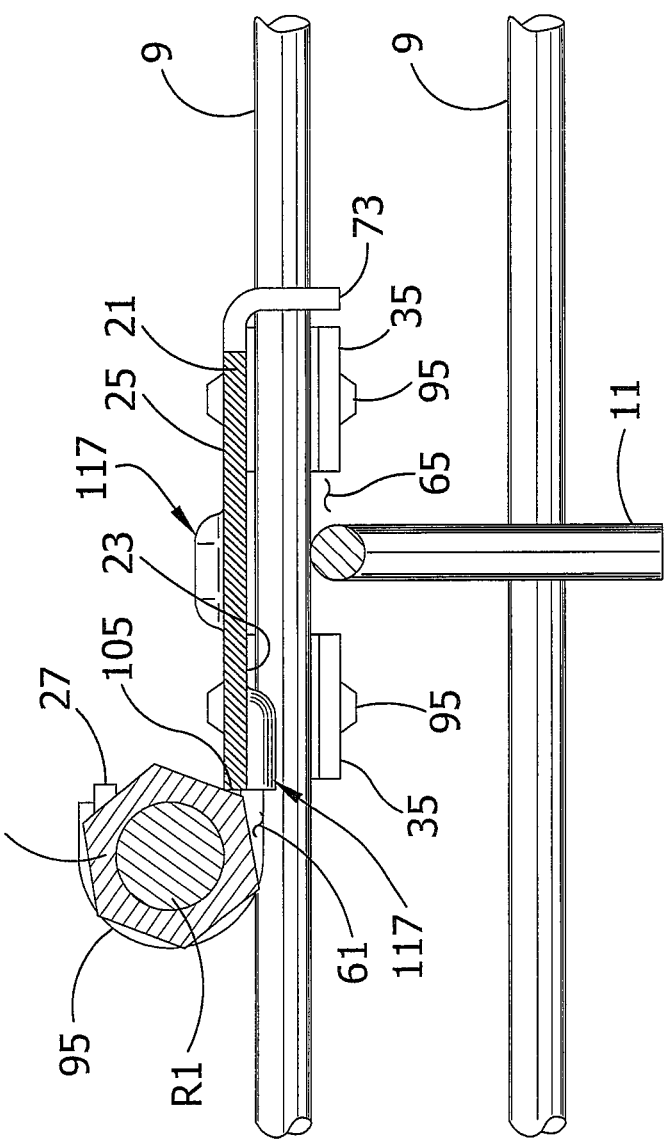
FIG. 4 is an enlarged section taken on line 4-4 of FIG. 3.
Figure 5:
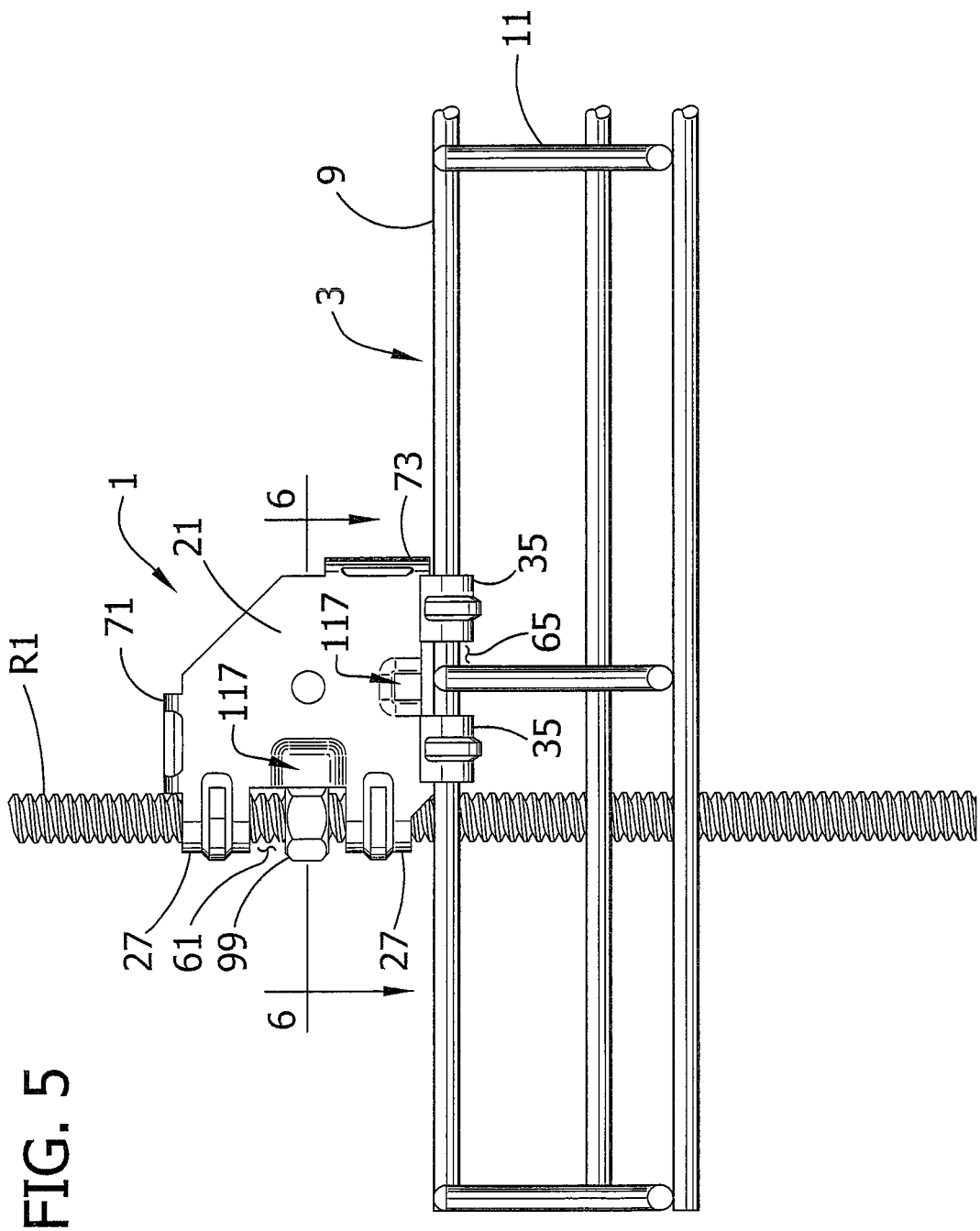
FIG. 5 is a front elevation of the hanger in FIG. 3 with the nut in an un-locked position in which it is free to rotate on the rod.
Figure 6:
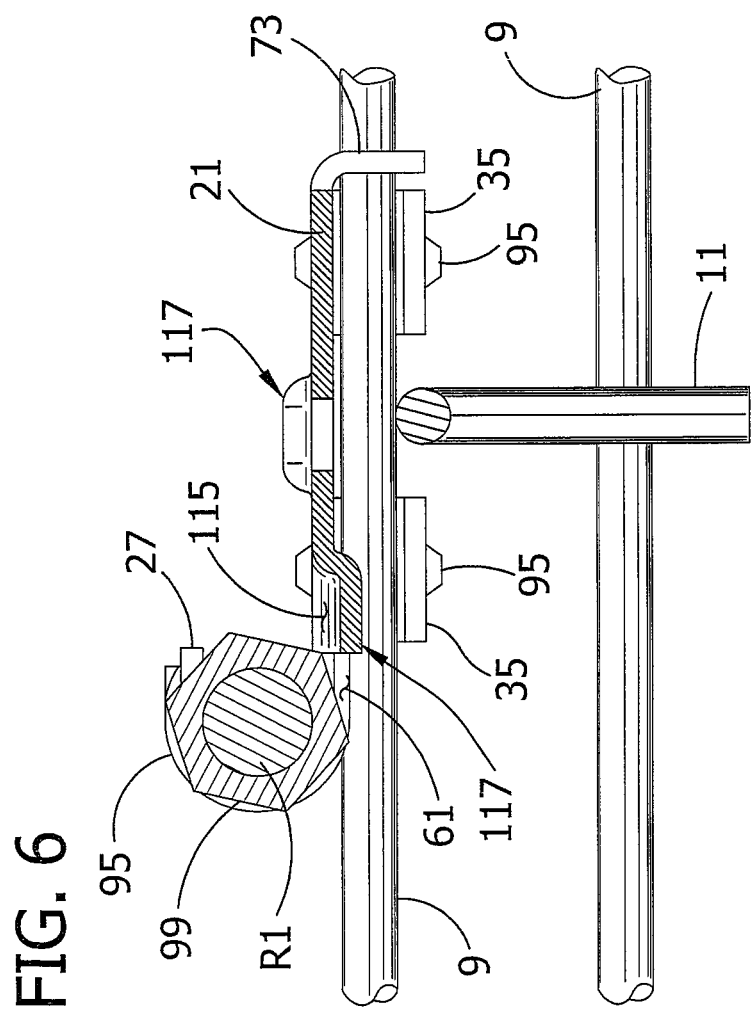
FIG. 6 is an enlarged section taken on line 6-6 of FIG. 5.

The hanger 1 preferably (but not necessarily) has a feature which facilitates adjustment of elevation of the hanger (and the cable tray 3) on the support rod. In this regard, the gap 61 between the two hooks 27 of the first set of hooks is sized and contoured to permit relative vertical movement between the hanger 1 and the nut 99 from a first un-locked position (FIGS. 5 and 6) in which the nut is at a location in the gap 61 in which it is freely rotatable on the rod, to a second locked position (FIGS. 3 and 4) in which the nut is at a different location in the gap 61 in which it is prevented from rotation by contact of the nut with the hanger. The gap 61 between the two hooks 27 is defined in part by a segment 105 along the first (generally vertical) side edge 31 of the hanger body 21 and in part by opposing (generally horizontal) edges 107 of the two hooks, namely, the lower edge of the upper hook 27 and the upper edge of the lower hook 27. It will be understood that the gap 61 could be defined in part by structures other than the two hooks 27. When the nut is in its locked position shown in FIGS. 3 and 4, the lower edge 107 of the upper hook 27 contacts the upper surface of the nut so that the hanger is supported at the desired elevation on the rod R1.

As illustrated in FIG. 2, the vertical segment 105 along the hanger body 21 is contoured to provide a nut-receiving recess 115 at a location corresponding to the stated un-locked position of the nut. This recess 115 is defined by a channel 117 formed in the hanger body 21 extending horizontally inward from the first side edge 31 of the hanger body. The channel 117 has opposite side walls 121 and a base wall 123 spaced from the plane 57 of the hanger body on a side of the plane opposite the two hooks 27. The nut-receiving recess 115 could have other configurations. The arrangement is such that when the nut 99 is received in the recess 115, corresponding to its stated un-locked position (FIGS. 5 and 6), it is free to rotate on the rod. After the nut 99 is threaded on the rod R1 to the desired position, the hanger 1 is allowed to drop down to a position corresponding to the stated locked position of the nut (FIGS. 3 and 4) in which the lower edge 107 of the upper hook contacts the nut 99 to support the hanger at the desired elevation, and in which a vertical surface of the polygonal nut (e.g., one of the vertical faces of a hexagonal nut) contacts the vertical segment 105 of the first side 31 of the hanger body 21 to prevent rotation of the nut, thus locking the hanger at the desired elevation. The height of the hanger 1 can be readily re-adjusted at any time simply by lifting the hanger to move the nut 99 into its un-locked position received in the channel-shaped recess 115, rotating the nut to the desired elevation on the support rod, and then lowering the hanger back down so that the nut is in its stated locked position supporting the hanger.

The channel 117 formed in the hanger body 21 also functions as a reinforcing rib to strengthen the area of the hanger body between the hooks 27, 35.

The gap 65 between the two hooks 35 of the second set is preferably configured in the same manner described above. As a result, the same adjustment procedure described above can be used when the hanger 1 is in an orientation in which the support rod R2 is received in the two hooks 35 of the second set of hooks.

It will be apparent from the foregoing that the hanger 1 described above has numerous advantages. It can be installed quickly and easily with only a minimal use of tools, and installation requires only one nut to be threaded on the support rod. The hanger can be used with different size rods, and each size rod fits in a designated area (a recess defined by a set of one or more hooks) specifically dimensioned for that size rod to provide better support. Also, the position of the hanger is easily adjustable along the support rod simply by threading a single nut up or down on the rod. Further, the hanger is economical to manufacture. For example, the hanger described above can be formed (e.g., in a stamping operation) as a one-piece member from sheet material, such as 14-gage (0.075 in. thick) sheet metal.

In the particular hanger embodiment shown in the drawings, the two sets of one or more hooks 27, 35 extend from adjacent sides of the hanger. However, it will be understood that the two sets could extend from opposite sides of the hanger. For example, referring to FIG. 2, the two sets could be located along the left and right vertical sides of the hanger body, and a suitable support device could be provided along the lower edge of the hanger body for supporting an object on the hanger. The support device could be of various types, including a bracket, threaded stud, or some other device. Also, the two sets of hooks on the hanger body could be sized for receiving threaded support rods of the same diameter or different diameters.

Also, while the hooks 27, 35 shown in the drawings extend from respective side edges of the hanger body, it will be understood that one or more sets of these hooks can be located toward the interior of the hanger body (i.e., off the perimeter of the hanger body) for receiving a support rod. In this case, a nut-receiving recess (corresponding to recess 115 described above) can be provided in a face 23, 25 of the hanger body.

Figure 7:
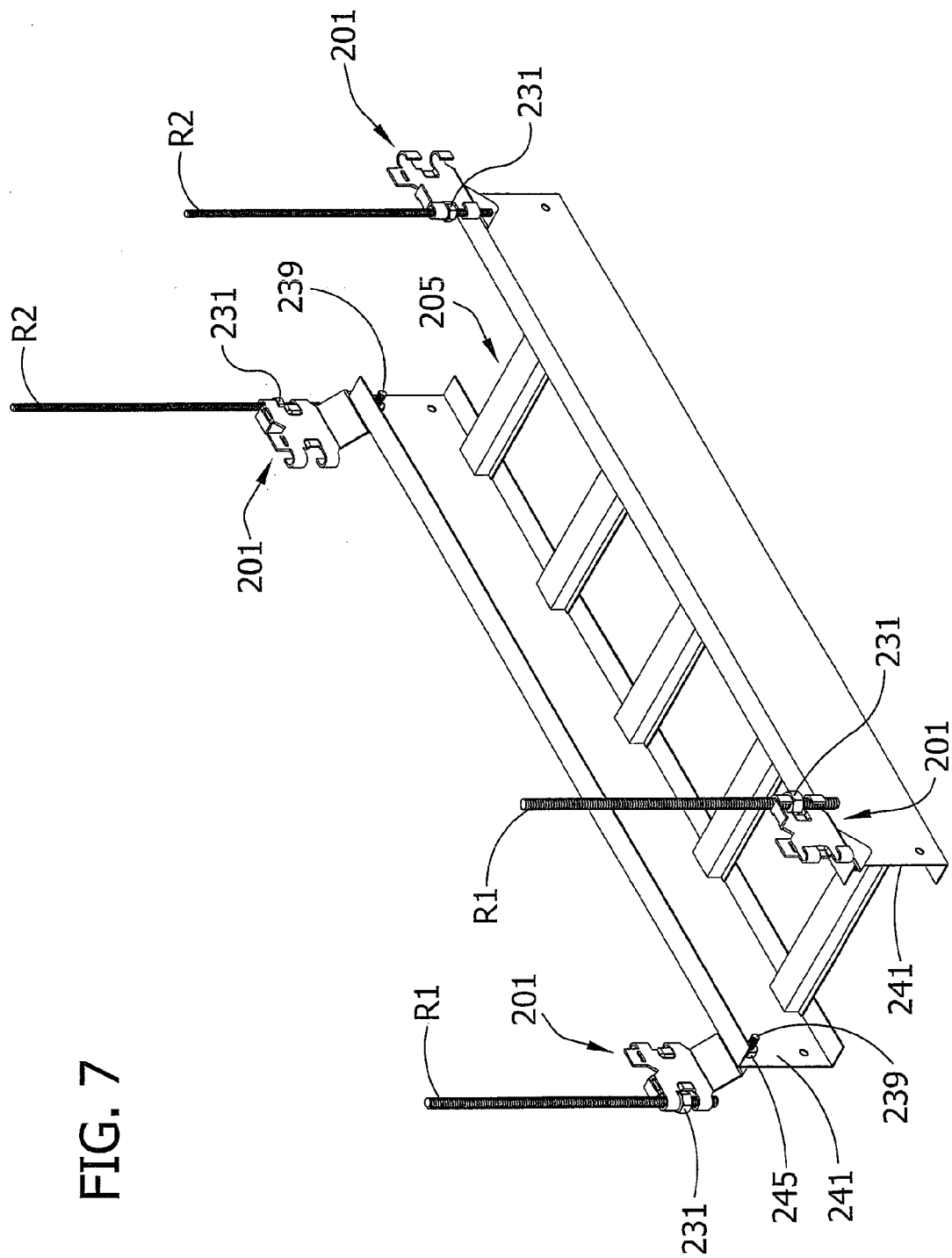
FIG. 7 is a perspective view of several hangers of a different embodiment of this invention supporting a cable tray on a number of threaded support rods.
Figure 8:
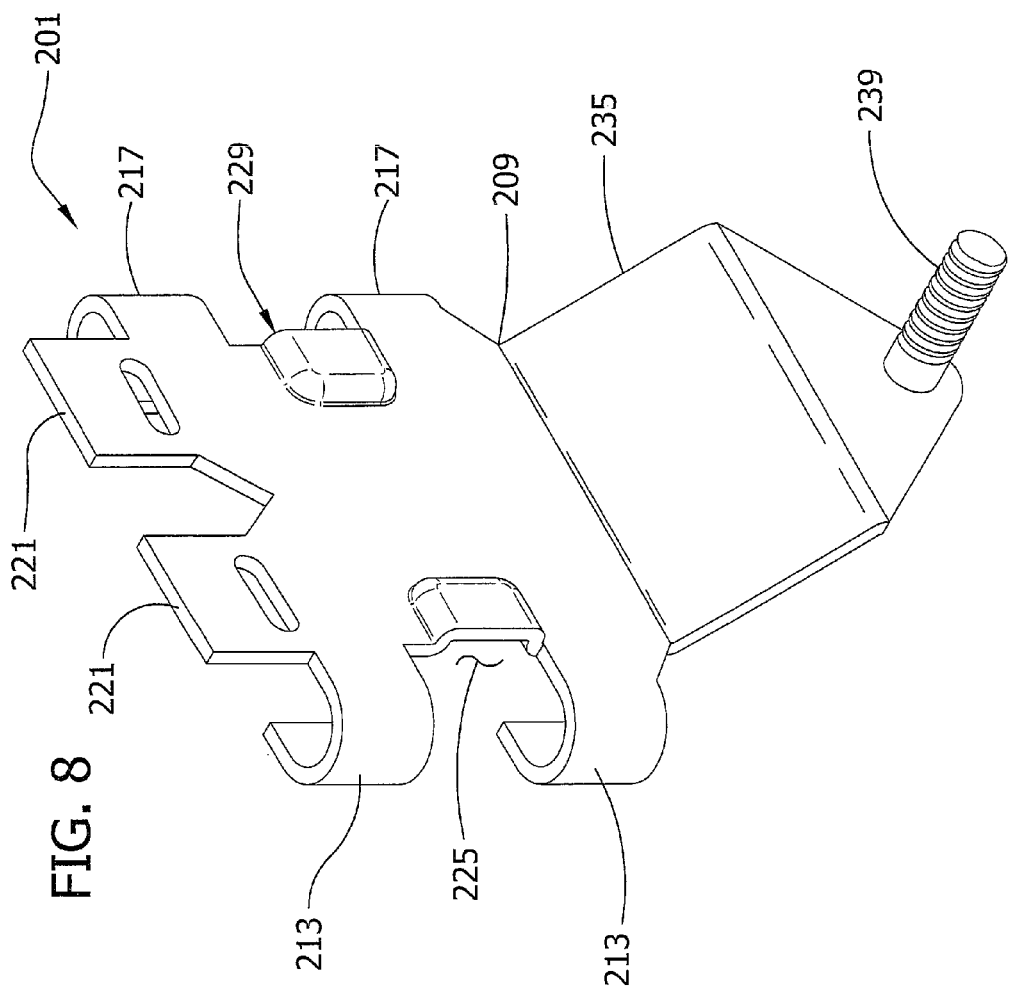
FIG. 8 is a perspective of a hanger of FIG. 7.

FIGS. 7 and 8 show a different embodiment of a hanger of this invention, generally designated 201, configured for supporting a cable tray 205, for example, from rods R1, R2. The hanger 201 comprises a hanger body 209 having a first set of hooks 213 projecting from one side of the hanger body, and a second set of hooks 217 projecting from an opposite side of the hanger body. The two sets of hooks 213, 217 are preferably sized for receiving support rods R1, R2 of two different sizes, as in the first embodiment, although this is not essential. Field bendable tabs 221, 223 are provided for securing support rod(s) R1, R2 in respective hooks. The hanger body 209 has nut-receiving recesses 225, 229 for receiving nuts 231 on the threaded rods R1, R2, as described above. The hanger body 209 comprises an extension 235 at its lower end configured for connection to the cable tray 205. In the illustrated embodiment, the extension 235 is provided with a protruding threaded stud 239 which is adapted to be inserted through an opening in a side rail 241 of the cable tray. A nut 245 threaded on the stud 239 is used to secure the connection between the hanger 201 and the cable tray 205.

Figure 9:
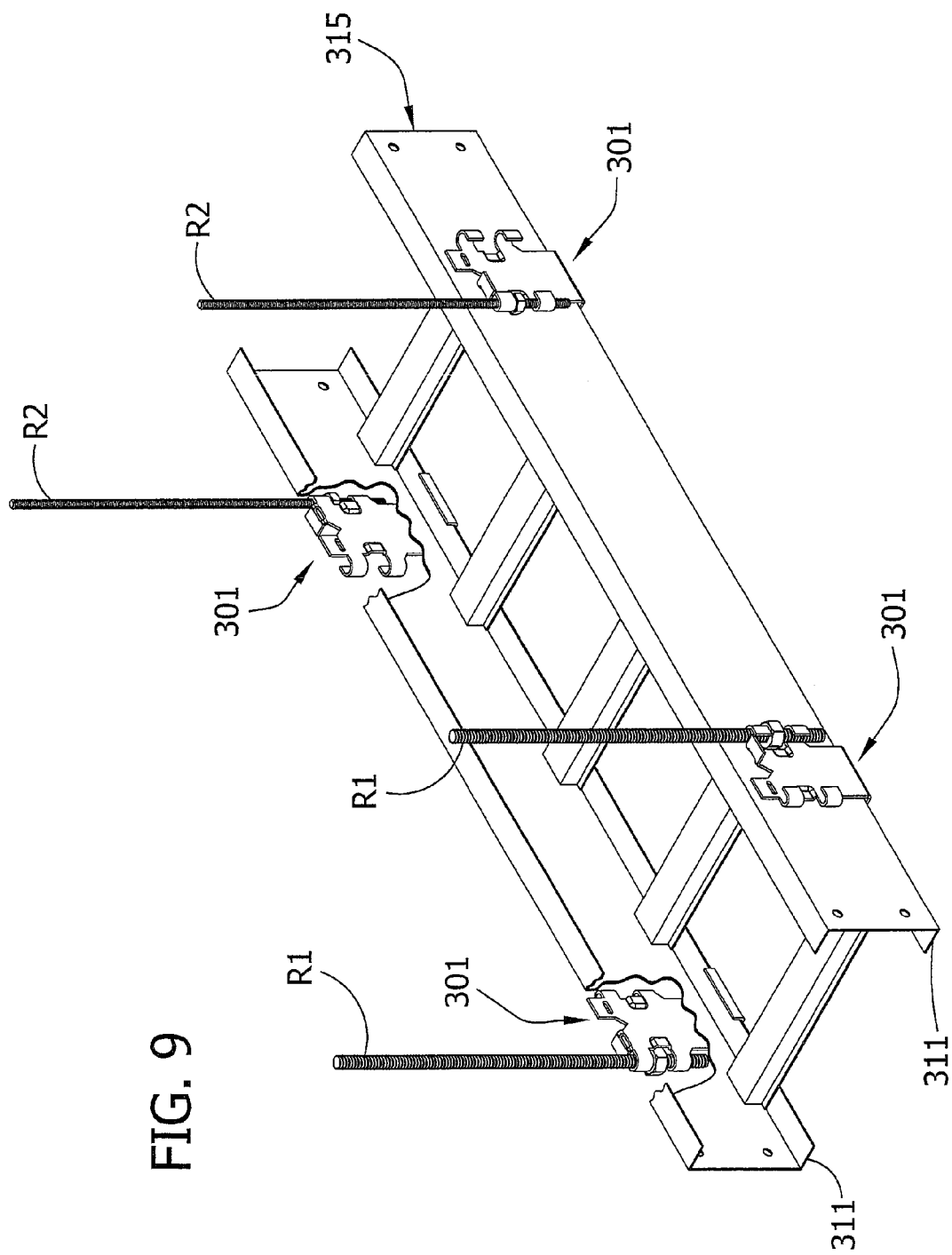
FIG. 9 is a perspective view of several hangers of a different embodiment of this invention supporting a cable tray on a number of threaded support rods.
Figure 10:
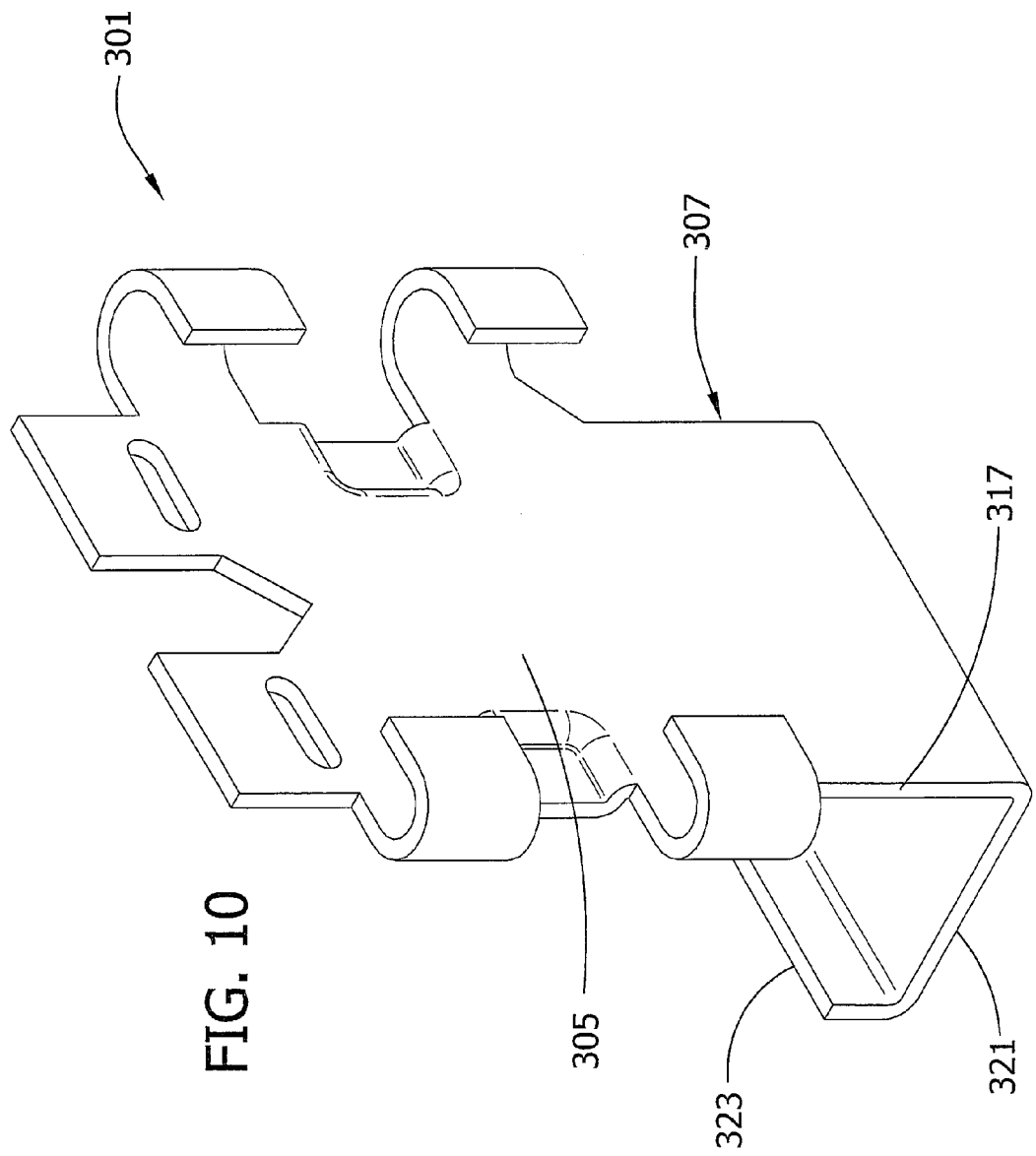
FIG. 10 is a perspective of a hanger of FIG. 9.

FIGS. 9 and 10 show a different embodiment of a hanger of this invention, generally designated 301. This hanger 301 is similar to the hanger 201 of the previous embodiment except that the hanger body 305 has an extension, generally designated 307, at its lower end which is configured for receiving the bottom portion of a side rail 311 of a cable tray 315. In particular, the extension 307 is generally J-shaped. It has a stem 317 generally planar with the hanger body 305, a bottom portion 321 bent to extend laterally outward from the stem 317 for underlying the side rail 311, and a lip 323 bent up from the bottom portion 321 to retain the side rail in place on the hanger. The extension 307 may be integrally formed as one piece with the hanger body 305, or it may be formed as a separate piece attached to the hanger body.

Figure 11:
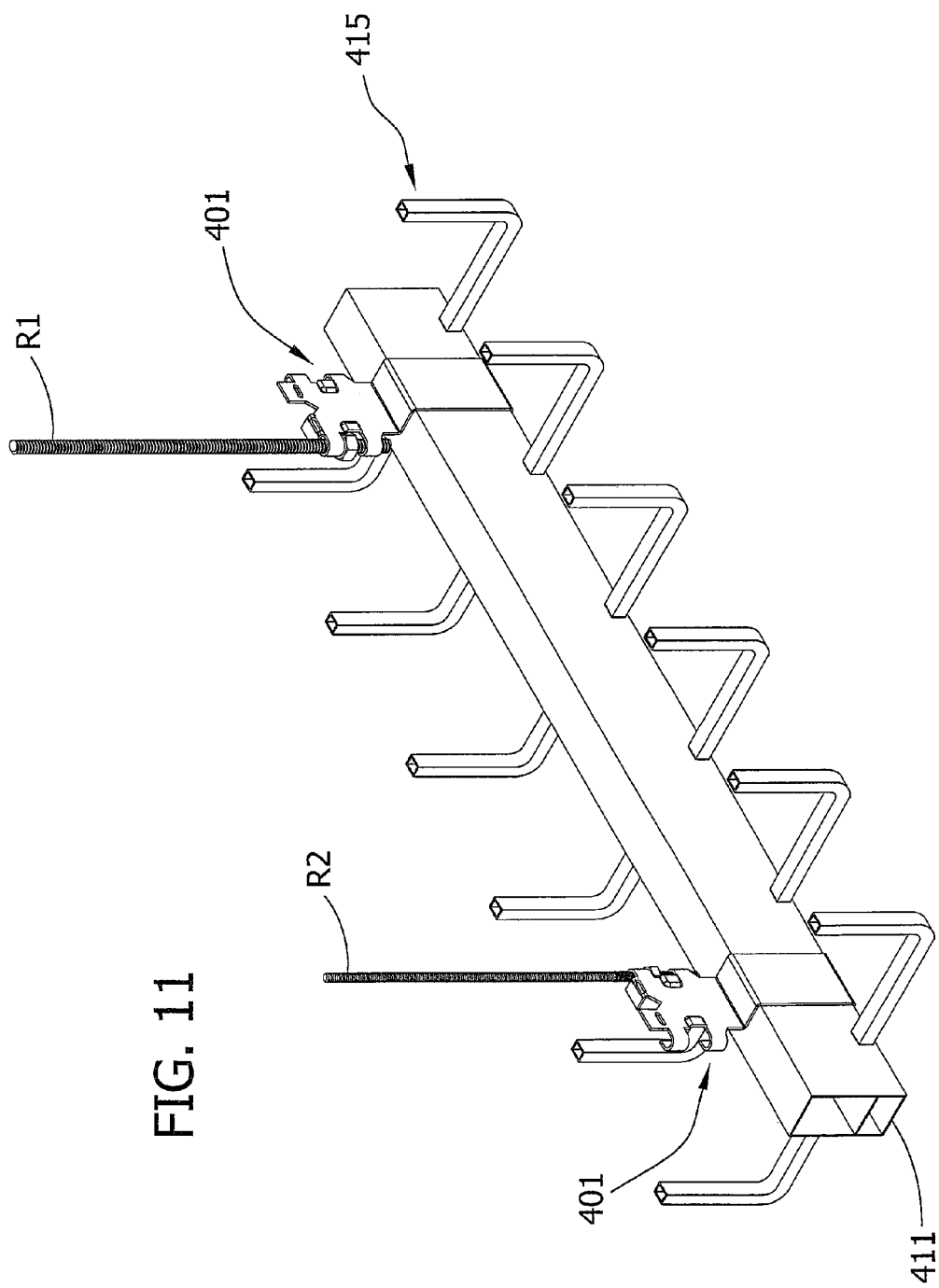
FIG. 11 is a perspective view of two hangers of a different embodiment of this invention supporting a cable tray on a threaded support rods.
Figure 12:
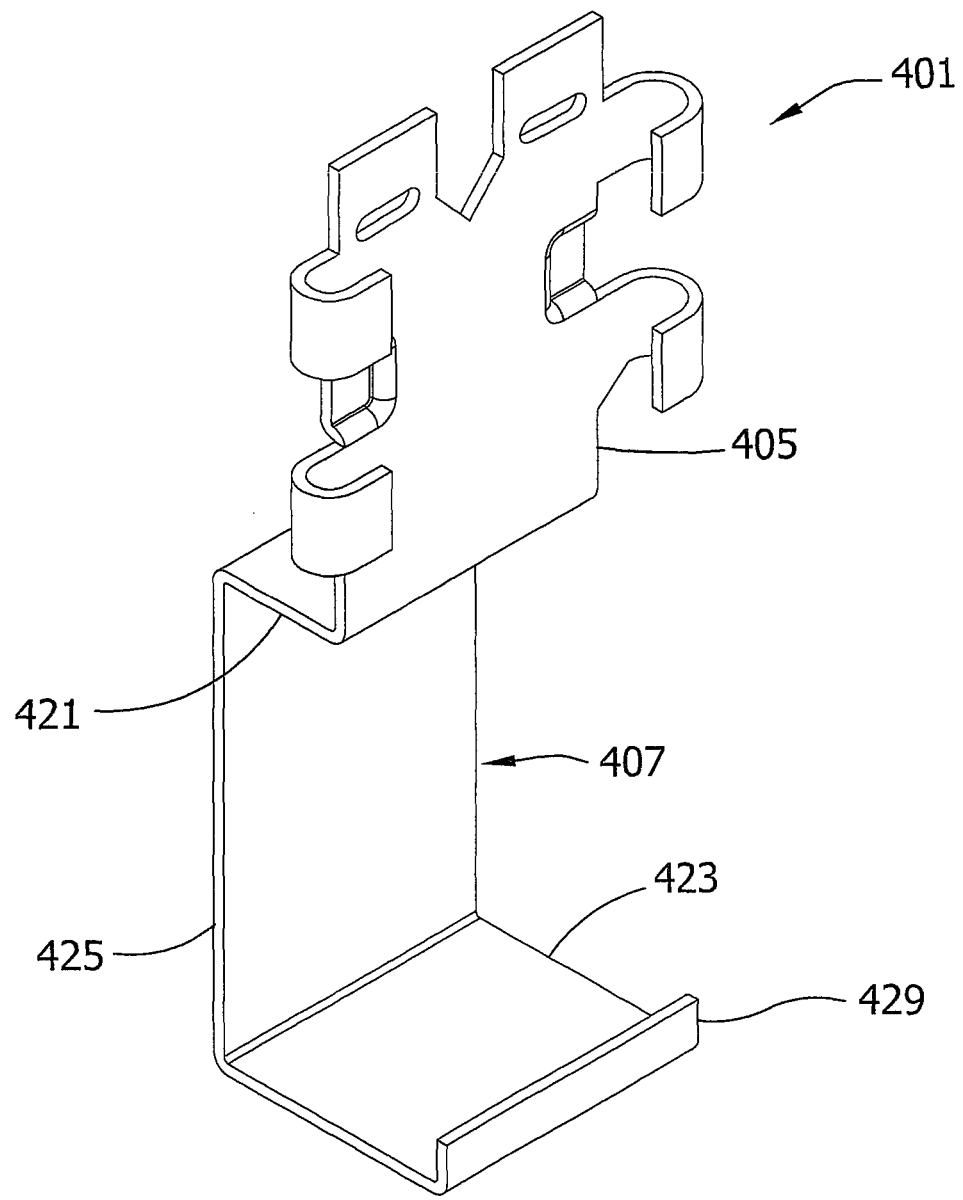
FIG. 12 is a perspective of a hanger of FIG. 11.

FIGS. 11 and 12 show a different embodiment of a hanger of this invention, generally designated 401. This hanger 401 is similar to the hangers 201 and 301 of the previous embodiments, except that the hanger body 405 has an extension, generally indicated at 407, at its lower end which is configured for receiving the box-section rail 411 of a cable tray 415. In particular, the extension 407 comprises a generally channel-shaped formation having a top portion 421 adapted to overlie the rail 411, a bottom portion 423 adapted to underlie the rail 411, and a connecting web 425 having a vertical length which is only slightly greater than the vertical depth of the rail 411 so that the fit of the rail between the top and bottom portions of the extension is relatively snug. A lip 429 is bent up from the bottom portion 423 to retain the box-section rail 411 in place on the hanger 401. The extension 407 may be integrally formed as one piece with the hanger body 405, or it may be formed as a separate piece attached to the hanger body.

Figure 13:
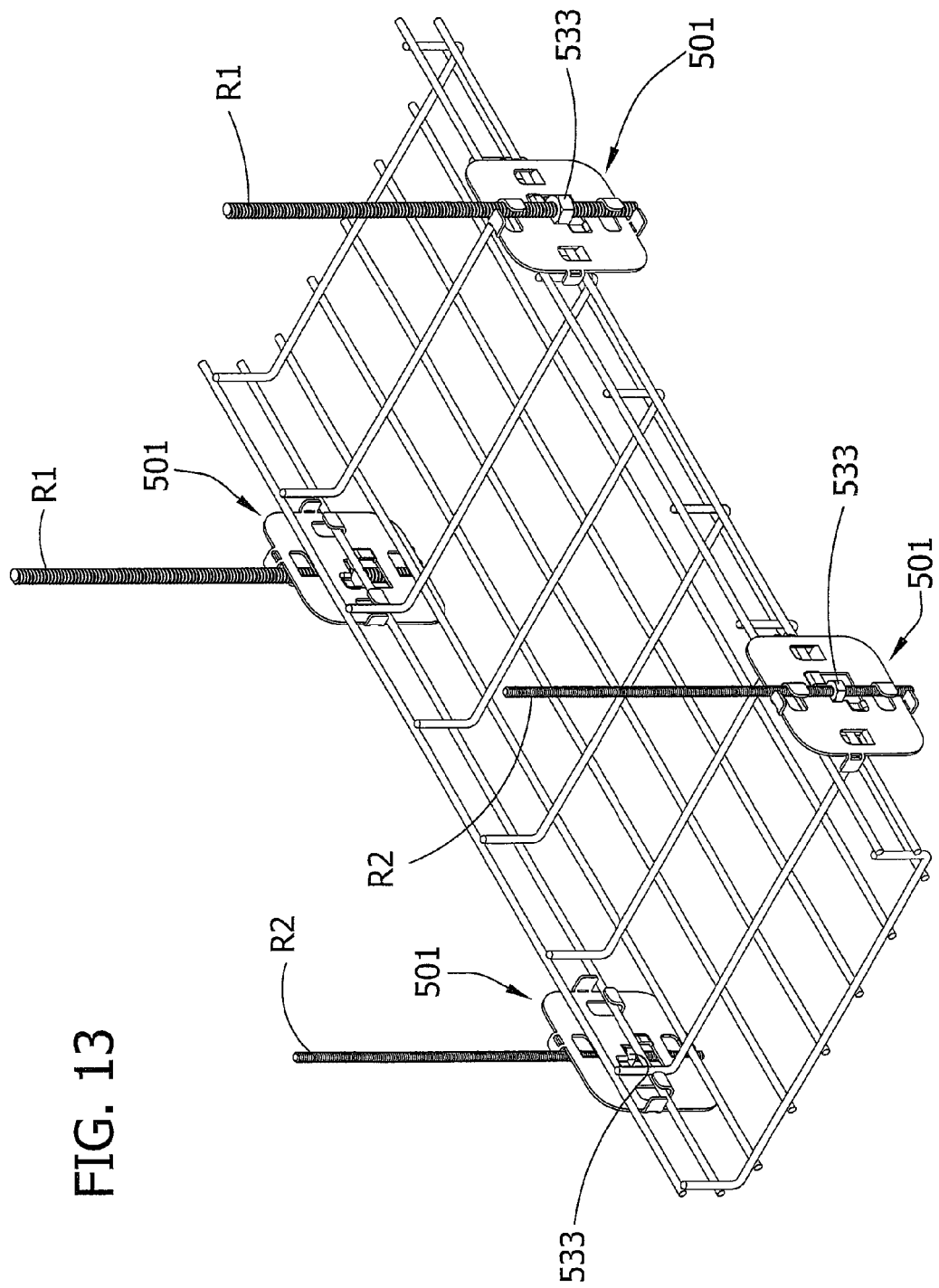
FIG. 13 is a perspective view of several hangers of a different embodiment of this invention supporting a wire basket cable tray on a number of threaded support rods.
Figure 14:
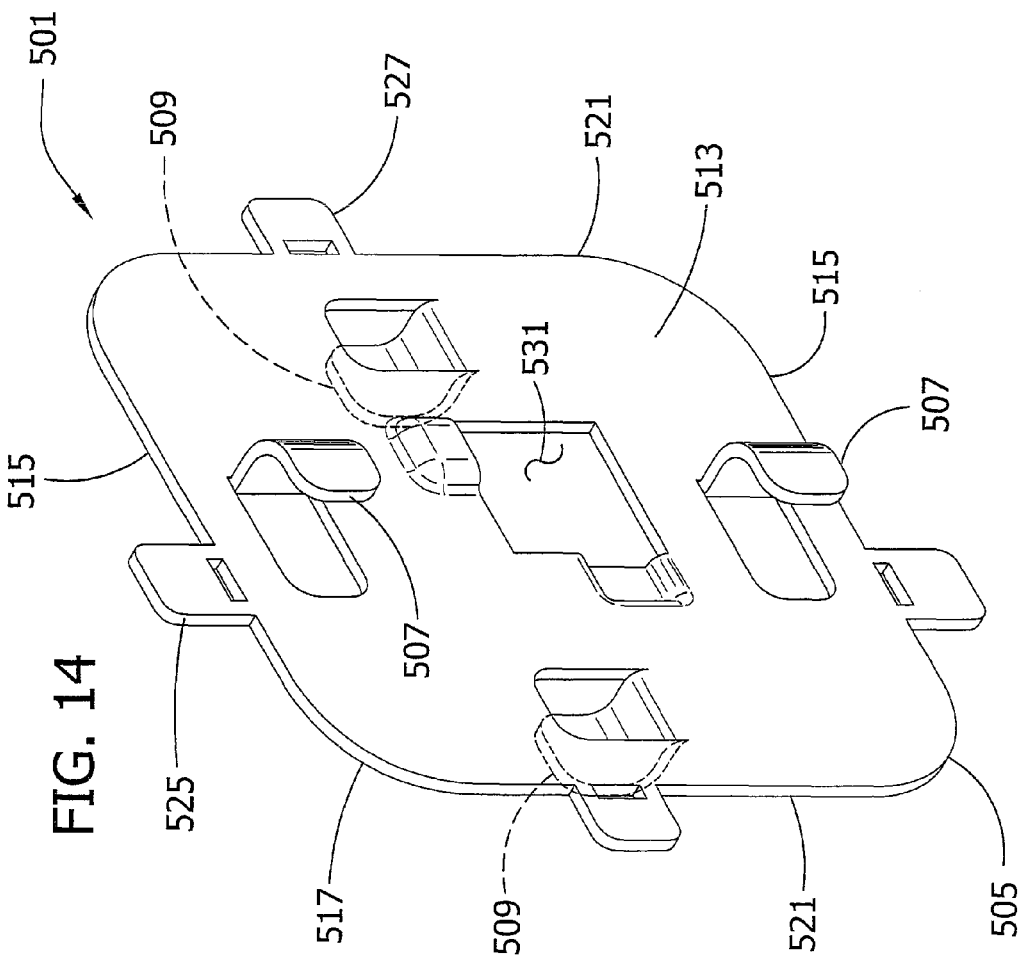
FIG. 14 is a perspective view of a hanger of FIG. 13.

FIGS. 13 and 14 show another version of a hanger of this invention, generally designated 501. The hanger is similar to the hanger 1 of the first embodiment, except that the hanger body 505 has a first set of one or more hooks 507, and a second set of one or more hooks 509 located on the interior of the hanger body, i.e., in an area inside the peripheral outline of the hanger body 505. In the illustrated embodiment, the hanger body 505 is generally rectangular, with rounded corners, but this shape may vary. The hooks 507 of the first set are formed by pieces of metal (e.g., L-shaped pieces of metal) struck from the hanger body 505 to extend on one face 513 of the body generally adjacent a first pair of opposite sides 515 of the body. Similarly, the hooks 509 of the second set are formed by pieces of metal (e.g., L-shaped pieces of metal) struck from the hanger body 505 to extend on an opposite face 517 of the body generally adjacent a second pair of opposite sides 521 of the body. The two sets of hooks 507, 509 are preferably formed to receive threaded support rods R1, R2 of different sizes, as described above in regard to the first embodiment. The support rods R1, R2 are retained in respective sets of hooks 507, 509 by field bendable tabs 525, 527, as in the first embodiment. Also, a nut-receiving recess 531 is provided in the hanger body 505 for receiving a nut 533 threaded on the rod R1 or R2 received in a respective set of the hooks 507, 509. As shown in FIG. 14, the hanger body 505 has only one such nut-receiving recess 531, but it will be understood that two separate recesses could be provided, one associated with each set of hooks 507, 509.

Figure 15:
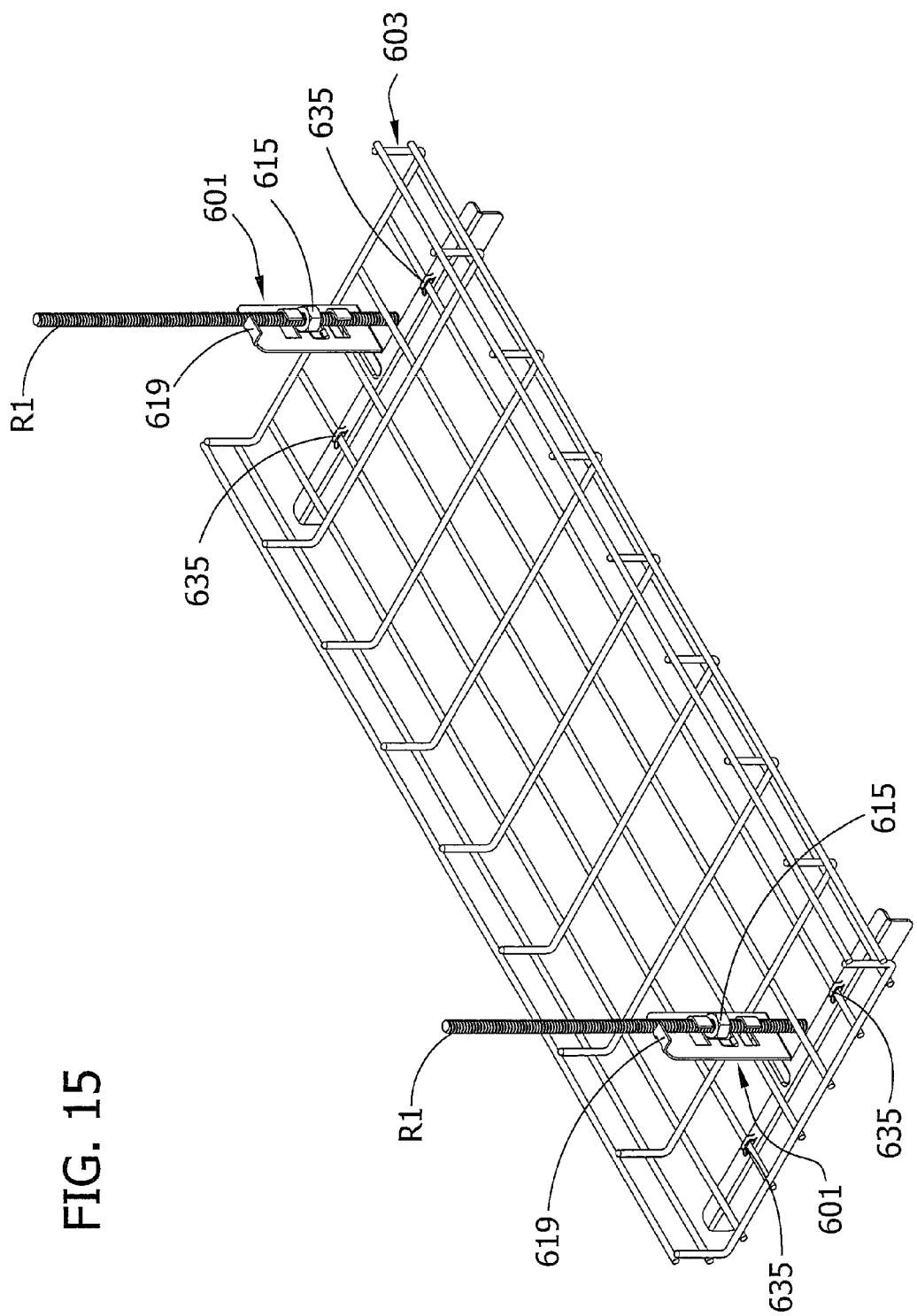
FIG. 15 is a perspective view of two hangers of a different embodiment of this invention supporting a wire basket cable tray on a number of threaded support rods.
Figure 16:
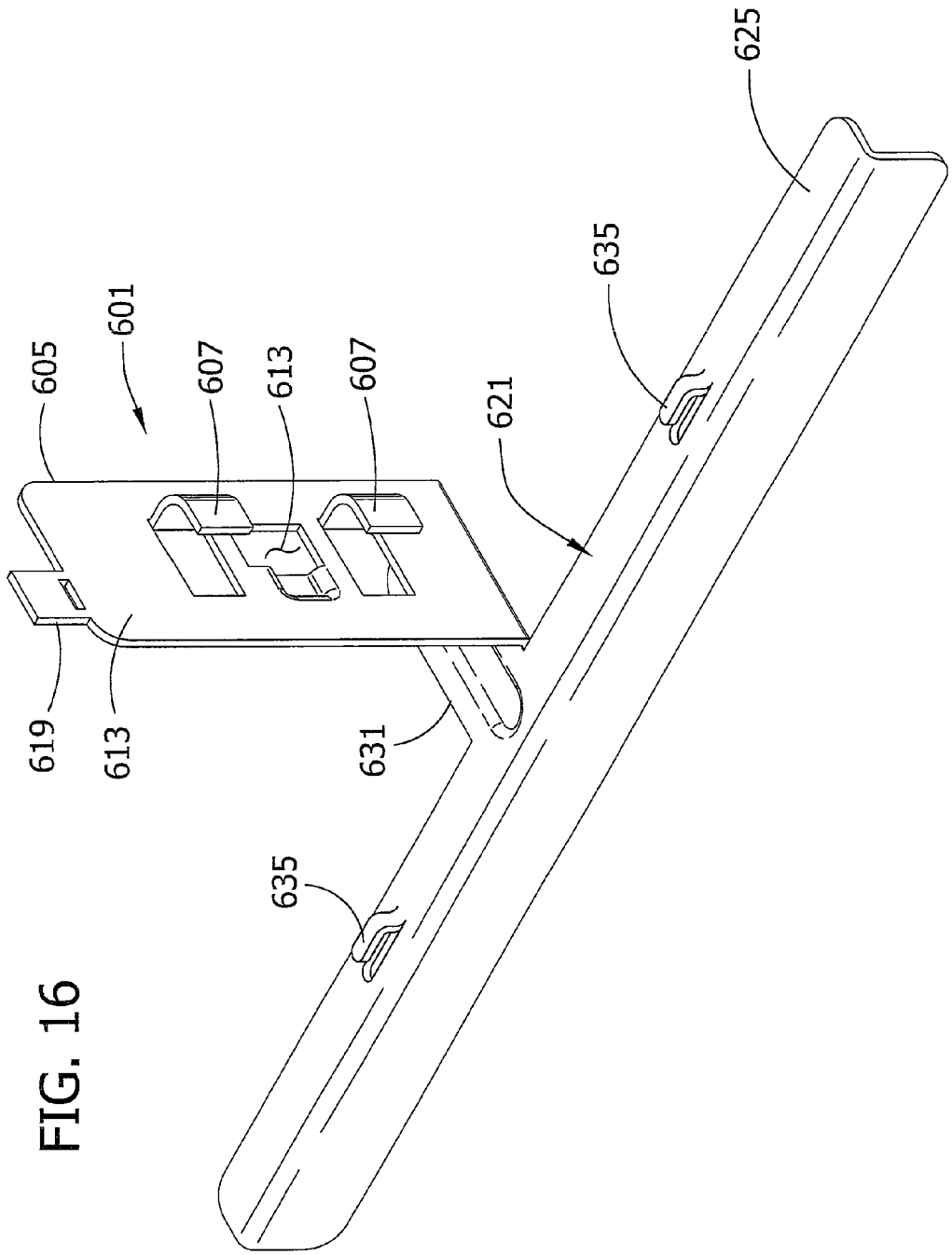
FIG. 16 is a perspective view of a hanger of FIG. 15.

FIGS. 15 and 16 show a different embodiment of a hanger, generally designated 601, for supporting a cable tray, e.g., a wire basket cable tray 603, or other object. The hanger 601 comprises a hanger body 605 having a set of one or more hooks 607 which are vertically spaced for receiving a threaded support rod R1. In the illustrated embodiment, the hanger body 605 is generally rectangular, but this shape may vary. The hooks 607 (two are shown) are formed by pieces of metal (e.g., L-shaped pieces of metal) struck from the hanger body 605 to extend on one face 613 of the body. A nut-receiving recess 613 is provided in the hanger body 605 for receiving a nut 615 threaded on the rod R1 received in the hooks 607. The hooks 607 and nut-receiving recess 613 function in the manner described above in regard to the first embodiment. The hanger body 605 has a field-bendable tab 619 at its upper end for securing the rod R1 in the hooks 607. The hanger body 605 also has an extension 621 at its lower end which is configured for supporting the cable tray 603. In particular, the extension 621 comprises an elongate bar 625 at the lower end of the hanger body 605 sized for spanning at least a substantial portion of (if the not entire width of) the cable tray 603 to provide stable underlying support. In one embodiment, the bar 625 is an angle bar, but other shapes may be used. The bar 625 is connected to the hanger body by a connecting portion 631. In the illustrated embodiment, the bar 625 extends in a direction which is generally at right angles to the plane of the hanger body 605, but this angle of orientation may vary from ninety degrees to zero degrees. The extension 621 may be integrally formed as one piece with the hanger body 605, or it may be formed as a separate piece attached to the hanger body. Optionally, the bar 625 may be provided with one or more field-bendable tongues 635 for securing the bar to wires of the cable tray 603.

Figure 17:
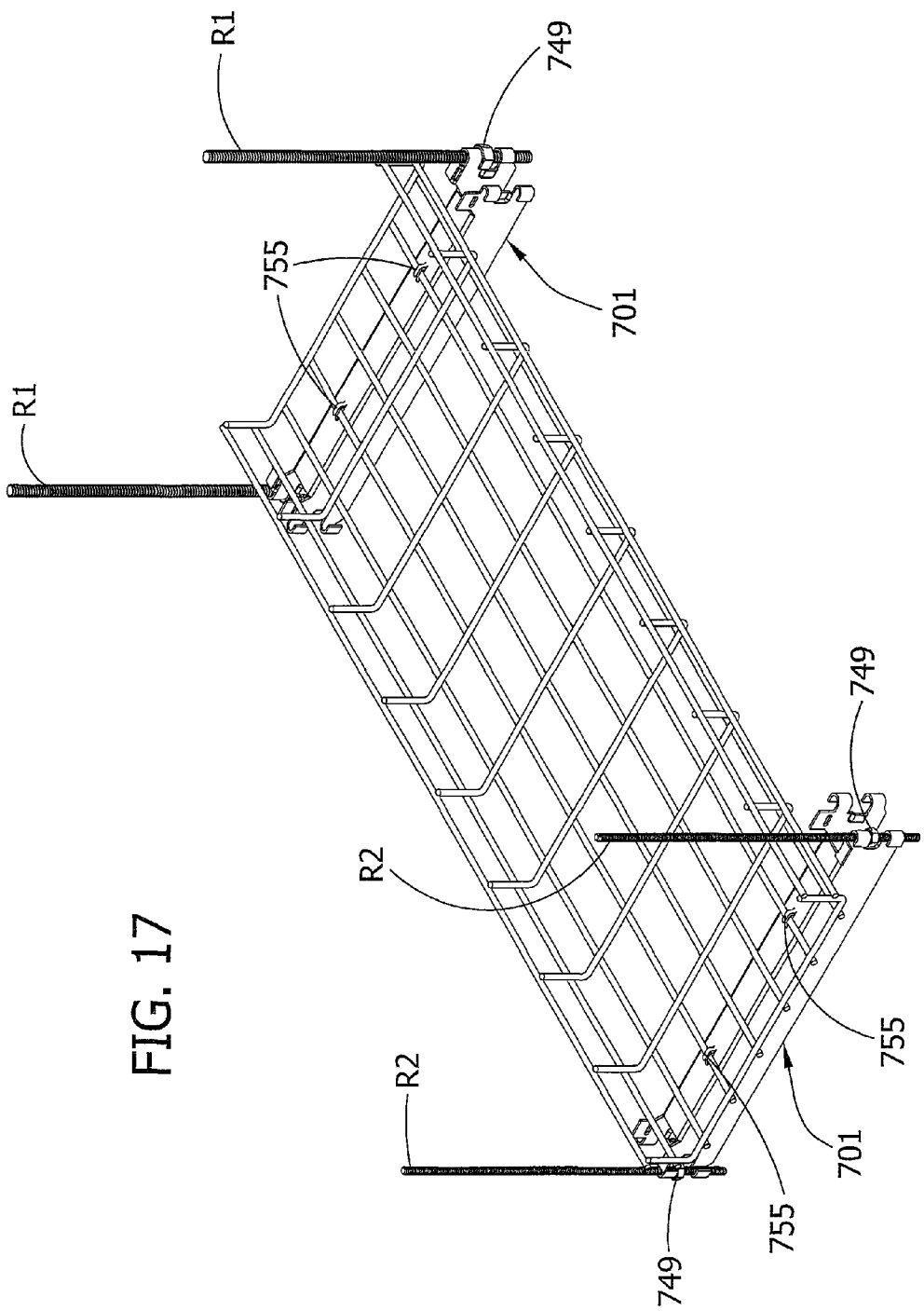
FIG. 17 is a perspective view of several hangers of a different embodiment of this invention supporting a wire basket cable tray on a number of threaded support rods.
Figure 18:
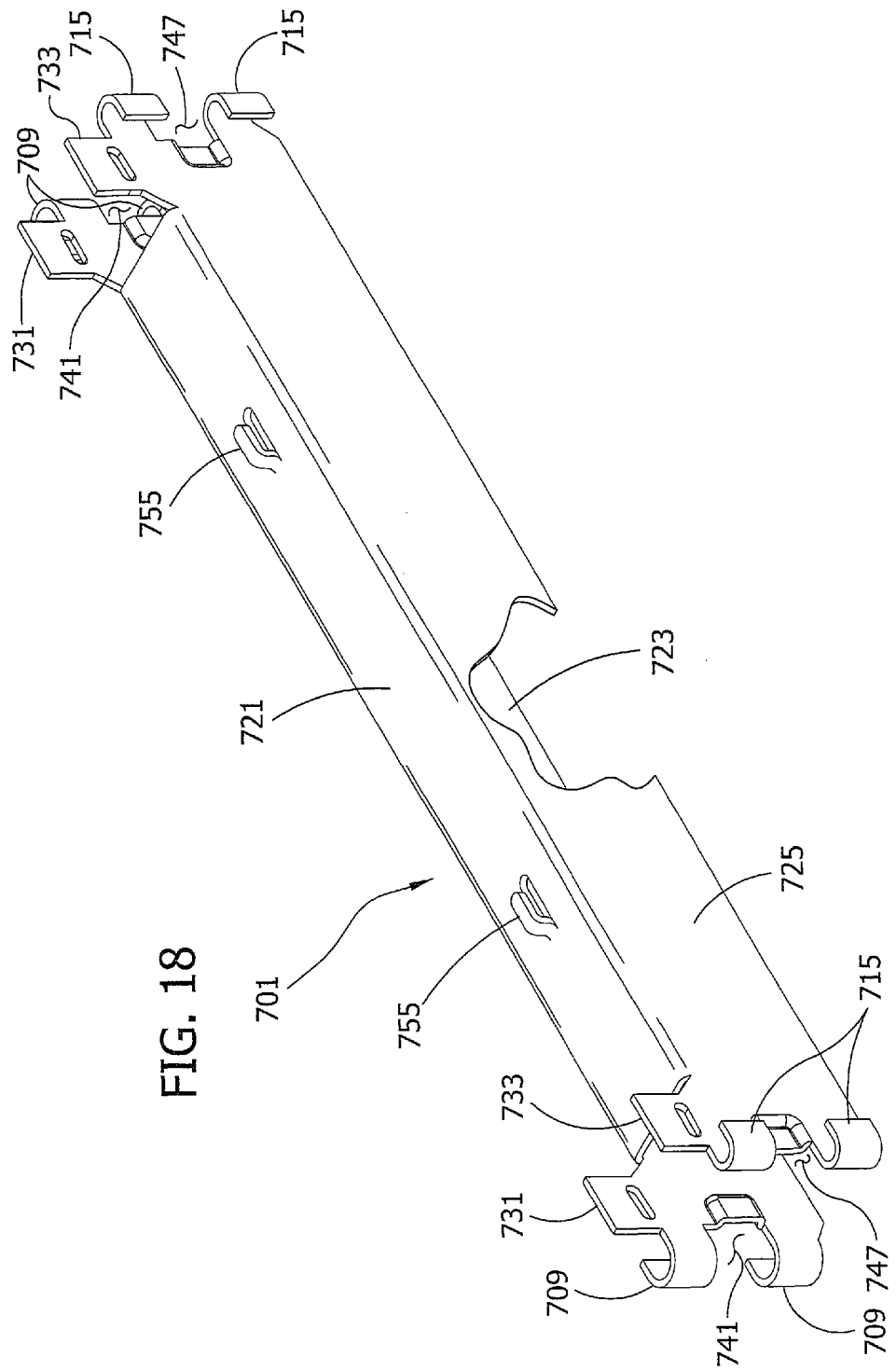
FIG. 18 is a perspective view of a hanger of FIG. 17.

FIGS. 17 and 18 illustrate a different hanger embodiment, indicated generally at 701, for supporting a cable tray, e.g., a wire basket cable tray 703 or other object. The hanger 701 comprises a hanger body 705 configured as elongate bar (also designated 705) which is adapted to underlie the cable tray 703 in a direction extending horizontally and generally transversely of the cable tray. The hanger 701 includes a first set of four hooks 709 (two vertically-spaced hooks at each end of the bar 705) and a second set of four hooks 715 (two vertically-spaced hooks at each end of the bar 705). The four hooks 709 of the first set are configured for receiving threaded support rods R1 of a first size, and the four hooks 715 of the second set are configured for receiving threaded support rods R1 of a second size. In the illustrated embodiment, the bar 705 comprises a top wall 721 and first and second spaced-apart side walls 723, 725 having end portions which project out beyond the top wall 721. Two hooks 709 of the first set of hooks extend from each end of the first side wall 723, and two hooks 715 of the second set of hooks extend from each end of the second side wall 725. A first set field-bendable tabs 731 project up from the end portions of the first side wall 723 for retaining the rods R1 in the hooks 709, and a second set of field-bendable tabs 733 project up from the end portions of the second side wall 725 for retaining the rods R1 in the hooks 715. The first side wall 723 has a first set of nut-receiving recesses 741 for receiving nuts 743 threaded on rods R1, and the second side wall 725 has a second set of nut-receiving recesses 747 for receiving nuts 749 threaded on rods R2. It will be understood that only one set of two rods R1 or R2 is used at any given time for each hanger 701, unless extra support is needed. The hooks 709, 715 and nut-receiving recesses 741, 747 function in the same manner described in previous embodiments. Optionally, the top wall 721 of the bar 705 may be provided with one or more field-bendable tongues 755 for securing the bar to wires of the cable tray 703. The hanger 701 in this embodiment is shown as fabricated from a single piece of metal, but it will be understood that it could be fabricated as separate parts secured together in a suitable manner. Further, the specific cross sectional shape of the bar 703 can vary, as can the shapes and positions of the hooks 709, 715 and tabs 731, 733. For example, the tabs 731, 733 could extend down from the side walls 723, 725 of the hanger.

A hanger of this invention can include only one of the features described above, or more than one such feature, or any combination of such features. For example, one embodiment may have two sets of one or more hooks on the hanger body, and these sets may be positioned at various locations on the hanger body. For example, the two sets of one or more hooks could extend from different (adjacent or opposite) sides of the hanger body or from other locations on the hanger body. In another embodiment, the two sets of hooks may be sized for receiving support rods of different diameters. In another embodiment, the hanger may have two or more hooks separated by a gap so that the hanger can be supported by a single nut on the support rod. In another embodiment, the gap may be sized and contoured so that the nut is movable in the gap between the un-locked and locked positions discussed above. In some embodiments, the hanger may be designed for supporting basket-wire cable tray. In other embodiments, the hanger may be designed to support different types of cable tray, or objects other than cable tray. The hanger may be provided with any number of different extensions and body styles, depending on the particular application and type of object to be supported by the hanger.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:
1. A hanger adapted for hanging an object from a generally vertical support rod, said hanger comprising
a hanger body,
a first set of one or more hooks on the hanger body defining a first hook-defined recess, and
a second set of one or more hooks on the hanger body defining a second hook-defined recess,
wherein said first set of one or more hooks comprises at least two hooks spaced from one another and defining a first gap therebetween sized and shaped for receiving a first nut threaded on a first vertical support rod, wherein said second set of one or more hooks comprises at least two hooks spaced from one another and defining a second gap therebetween sized and shaped for receiving a second nut threaded on a second vertical support rod, wherein the hanger body defines a first nut-receiving recess configured to selectively receive the first nut when the first nut is received in the first gap, wherein the hanger body defines a second nut-receiving recess configured to selectively receive the second nut when the second nut is received in the second gap, wherein the first nut-receiving recess is disposed between the two hooks of the first set of one or more hooks, wherein the second nut-receiving recess is disposed between the two hooks of the second set of one or more hooks.

2. A hanger as set forth in claim 1 wherein each of the first and second the nut-receiving recesses comprises a channel extending horizontally from an edge of the hanger body.

3. A hanger as set forth in claim 1 wherein the first nut-receiving recess comprises a first channel extending horizontally from a first edge of the hanger body, the first edge being disposed between the two hooks of the first set of one of more hooks, wherein the second nut-receiving recess comprises a second channel extending horizontally from a second edge of the hanger body, the second edge being disposed between the two hooks of the second set of one of more hooks.

4. A hanger as set forth in claim 3 wherein the first channel has opposite sides walls and a base wall spaced from a plane of the hanger body, the two hooks of the first set of one or more hooks being located on a first side of the plane and the base wall being located on a second side of the plane opposite the first side of the plane.

5. A hanger as set forth in claim 1 further comprising a first tab extending from the hanger body, said first tab being field bendable when said first vertical support rod is received in said first set of one or more hooks to retain the first vertical support rod in said first hook-defined recess, and a second tab extending from the hanger body, said second tab being field bendable when said second vertical support rod is received in said second set of one or more hooks to retain said second vertical support rod in said second hook-defined recess.

6. A hanger as set forth in claim 1 wherein said hanger body comprises an extension configured for a threaded connection with a rail of a cable tray.

* * * * *